UNITED STATES PATENT OFFICE.

WILLIAM H. FOYE, OF SAN FRANCISCO, CALIFORNIA.

IMPROVEMENT IN THE MANUFACTURE OF ARTIFICIAL STONE.

Specification forming part of Letters Patent No. 109,607, dated November 29, 1870.

*To all whom it may concern:*

Be it known that I, WILLIAM H. FOYE, of the city and county of San Francisco, State of California, have invented certain new and useful Improvements in the Manufacture of Artificial Stone; and I do hereby declare that the following description of the same is sufficient to enable any person skilled in the art or science to which it most nearly appertains to make said stone, the names of the ingredients and manner of mixing and preparing being given.

My invention relates to an improved manner of producing or manufacturing an artificial stone which shall be suitable for use in my improved construction of submarine walls, patented July 1, 1869. Blocks for street-pavements of superior value can also be made in the same manner, and out of the same material, at a comparatively small expense, as well as blocks for building and other similar uses.

My invention consists in forming and compressing into blocks a well-known and common mixture, by which I am able to produce blocks which will be strong and substantial, and equal to any stone in durability and strength, for the purposes for which they are intended.

For the manufacture of my artificial stone I use pulverized limestone or other calcareous rock, mixed with asphaltum in a tank, and heated to a degree sufficient to evaporate the bitumen from the asphaltum. A small proportion of sulphur will greatly facilitate the combination of the ingredients. The heat also disengages the carbonic acid from the pulverized limestone, and secures a mechanical mixture much more intimate than ordinary mechanical compounds. I use about eighty parts of rock and twenty parts of asphaltum; but the proportion of the ingredients will be regulated according to the consistence to which it is desired to reduce the mass. The asphaltum must first be placed in a suitable tank and reduced to a liquid by the application of heat or steam. The degree of heat required to properly prepare the asphaltum for the reception of the other ingredients will generally depend upon its purity, or, rather, the fatness of the asphaltum in bitumen; but heat can be applied, if desired, until the asphaltum becomes calcined. The ingredient or ingredients intended to be incorporated with the asphaltum is then mixed with it, and the whole mass stirred, or otherwise thoroughly worked, by proper mechanical means, until a homogeneous mass results. This mixture is then placed in molds suitable for giving to the block the desired size and shape, and hydraulic or other pressure applied, so as to compress the mass in the mold into a solid block, which will be found to be of great strength and durability, yet possessing a certain amount of elasticity of great service, especially when used for pavements. As the block would shrink considerably after leaving the press, no matter how powerful, I use a stream of water to cool the block while in the press, thus reducing the shrinkage to a minimum.

In forming blocks for use in building submarine walls, I prepare my dies or molds so that a hole shall be left through the block at each end, through which the guide-rods pass in lowering the block to its bed. In this manner blocks suitable for many uses and of great durability can be molded and pressed into any desired shape or pattern at a small expense, especially where asphaltum can be readily obtained, and the blocks, when once made, can be transported to any distance with little cost for freight.

I am aware that my combination of ingredients is not of itself new, and I also know that artificial stones have been formed by means of molds, and hence I do not claim these broadly; but

What I claim as my invention, and desire to secure by Letters Patent, is—

Artificial stone formed of pulverized limestone or other calcareous rock, combined with asphaltum, the mixture being heated and subjected to hydraulic or other heavy pressure, and formed into blocks by means of molds, substantially as and for the purpose described.

In witness whereof I have hereunto set my hand and seal.

WILLIAM H. FOYE. [L. S.]

Witnesses:
J. L. BOONE,
GEO. H. STRONG.